United States Patent
Vos et al.

(10) Patent No.: US 8,682,504 B2
(45) Date of Patent: Mar. 25, 2014

(54) SYSTEM AND METHOD FOR DEVELOPING DYNAMIC POSITIONAL DATABASE FOR AIR VEHICLES AND TERRAIN FEATURES

(75) Inventors: David W. Vos, Delaplane, VA (US);
Vladislav Gavrilets, Fairfax, VA (US);
Damien B. Jourdan, Falls Church, VA (US); Ben T. Ludington, Gainesville, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/487,864

(22) Filed: Jun. 4, 2012

(65) Prior Publication Data
US 2013/0325215 A1 Dec. 5, 2013

(51) Int. Cl.
*G01C 23/00* (2006.01)
*G06F 17/00* (2006.01)

(52) U.S. Cl.
USPC ............................................................ 701/3

(58) Field of Classification Search
USPC ............................................................ 701/3
See application file for complete search history.

(56) References Cited

U.S. PATENT DOCUMENTS

| | | | |
|---|---|---|---|
| 7,486,291 B2 * | 2/2009 | Berson et al. | 345/427 |
| 2007/0129853 A1 * | 6/2007 | Greenfeld et al. | 701/3 |
| 2008/0158256 A1 * | 7/2008 | Russell et al. | 345/629 |
| 2010/0017046 A1 * | 1/2010 | Cheung et al. | 701/2 |
| 2010/0283782 A1 * | 11/2010 | He | 345/420 |
| 2010/0305782 A1 * | 12/2010 | Linden et al. | 701/3 |

* cited by examiner

*Primary Examiner* — Mary Cheung
*Assistant Examiner* — Frederick Brushaber
(74) *Attorney, Agent, or Firm* — Donna P. Suchy; Daniel M. Barbieri

(57) ABSTRACT

A system for creating a digital representation of a status of one or more air vehicles and of sensed external objects includes one or more air vehicles, one or more sensors coupled to each of the one or more air vehicles, and a processor. The processor is configured to determine navigation information associated with travel of each of the one or more air vehicles, and capture data associated with the sensed external objects sensed by the one or more sensors. The processor is further configured to identify and track the sensed external objects in the captured data, geo-locate the identified sensed external objects via dynamic landmarking, and dynamically update a landmark database. The processor is further configured to utilize the landmark database to control at least one or more functions in a respective air vehicle of the one or more air vehicles.

15 Claims, 4 Drawing Sheets

SYSTEM AND METHOD FOR DEVELOPING DYNAMIC POSITIONAL DATABASE FOR AIR VEHICLES AND TERRAIN FEATURES

FIELD

The present disclosure relates to systems and methods for developing a dynamic positional database for air vehicles and terrain features.

BACKGROUND

Modern airborne platforms employ a variety of payloads for Intelligence, Surveillance, and Reconnaissance (ISR) data collection, which provide data of objects on the ground from an air vehicle. A vast majority of the data collected by these air vehicles may currently be of little or no utility. For example, as an air vehicle is route to its mission location, the imagery that is captured by imaging devices on the air vehicle is either not collected or not used by the ground operators. Even when the air vehicle is in a mission location collecting and transmitting imagery over the area of interest, only a small fraction of the captured information may result in useful, actionable intelligence. Moreover, the imagery can be of limited utility when used for targeting purposes due to the errors and latency in the air vehicle navigation and in targeting calculations. Additionally, the collected imagery can often only be accessed through individual ground data terminals, where data from dissimilar platforms cannot be easily cross-checked.

As a result, there may lack an ability to provide real-time updating of a positional database, which provides information regarding air vehicles and terrain features that may be utilized for targeting and navigation of the air vehicles. Therefore, improvements in managing positional data and utilizing that data for more accurate targeting may be desirable.

SUMMARY

In one aspect, a system for creating a digital representation of a status of one or more air vehicles and of sensed external objects includes one or more air vehicles, one or more sensors coupled to each of the one or more air vehicles, and a processor. The processor is configured to determine navigation information associated with travel of each of the one or more air vehicles, and capture data associated with the sensed external objects sensed by the one or more sensors coupled to each of the one or more air vehicles during travel of the one or more air vehicles. The sensed external objects include at least one of terrain features and sensed signals. The processor is further configured to identify and track the sensed external objects in the captured data, geo-locate the identified sensed external objects via dynamic landmarking, and dynamically update a landmark database. The landmark database includes at least one or more of positional data associated with travel of each of the one or more air vehicles and the sensed external objects based on the determined navigation information and the dynamic landmarking, covariance of the positional data, and sensor signal snippets of the sensed external objects. The processor is further configured to utilize the landmark database to control at least one or more functions in a respective air vehicle of the one or more air vehicles.

According to another aspect, a processor implemented method for creating a digital representation of a status of one or more air vehicles and of sensed external objects, includes determining navigation information associated with travel of each of the one or more air vehicles, and capturing data associated with the sensed external objects sensed by the one or more sensors coupled to each of the one or more air vehicles during travel of the one or more air vehicles. The sensed external objects include at least one of terrain features and sensed signals. The method further includes identifying and tracking the sensed external objects in the captured data, geo-locating the identified sensed external objects via dynamic landmarking, and dynamically updating a landmark database. The landmark database includes at least one or more of positional data associated with travel of each of the one or more air vehicles and the sensed external objects based on the determined navigation information and the dynamic landmarking, covariance of the positional data, and sensor signal snippets of the sensed external objects. The method further includes utilizing the landmark database to control at least one or more functions in a respective air vehicle of the one or more air vehicles.

According to yet another aspect, there is provided computer readable storage medium storing one or more programs, the one or more programs including instructions that, when executed by a computing device, cause the device to determine navigation information associated with travel of one or more air vehicles, and capture data associated with sensed external objects sensed during travel of the one or more air vehicles. The sensed external objects include at least one of terrain features and sensed signals. The instructions further cause the device to identify and track the sensed external objects in the captured data, geo-locate the identified sensed external objects via dynamic landmarking, and dynamically update a landmark database. The landmark database includes at least one or more of positional data associated with travel of each of the one or more air vehicles and the sensed external objects based on the determined navigation information and the dynamic landmarking, covariance of the positional data, and sensor signal snippets of the sensed external objects. The instructions further cause the device to utilize the landmark database to control at least one or more functions in a respective air vehicle of the one or more air vehicles.

It is to be understood that both the foregoing general description and the following detailed description are exemplary and explanatory only and are not restrictive of the invention, as claimed.

DESCRIPTION OF EXEMPLARY EMBODIMENTS

Reference will now be made in detail to exemplary embodiments illustrated in the accompanying drawings. Wherever possible, the same reference numbers will be used throughout the drawings to refer to the same or like parts.

Figure 1:
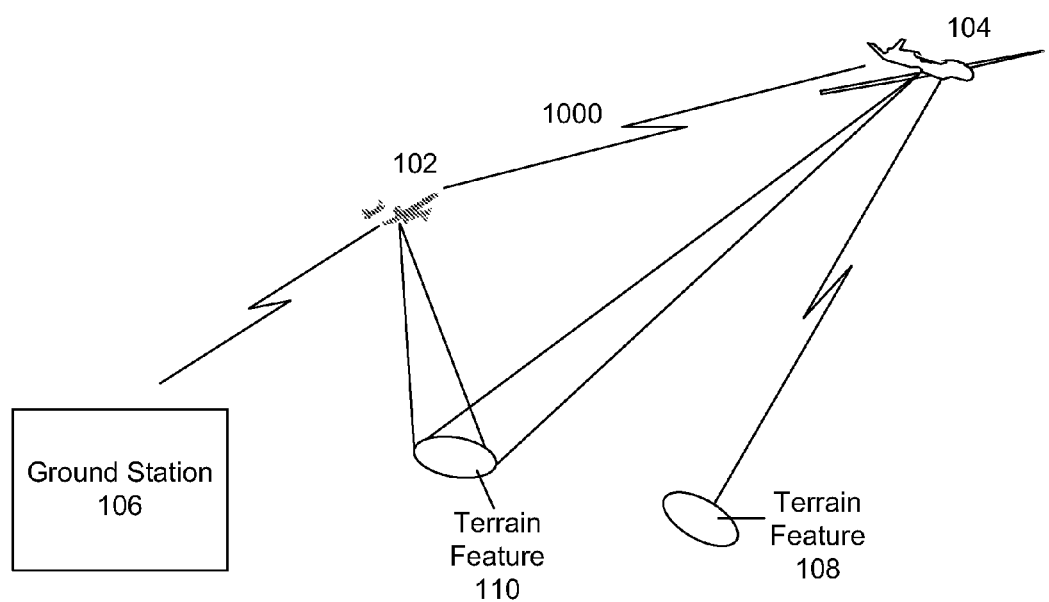
FIG. 1 illustrates an exemplary environment in which an exemplary embodiment of the system and method may be applied.

FIG. 1 illustrates an exemplary environment 100 for which a digital representation of a status of one or more air vehicles and of sensed external objects may be created. Environment 100 may include two air vehicles 102 and 104, respective terrain features 110 and 108, and a ground station 106. The air vehicles 102 and 104 and the ground station 106 may communicate and exchange data with each other through a network 1000. The network 1000 may be a secured network. Sensors on the air vehicles 102 and 104 capture data with respect to sensed external objects. In this example, air vehicle 102 may capture an image of terrain feature 110, while the air vehicle 104 may capture an image of terrain features 108, along with the signal strength of terrain feature 108, which is broadcasting a signal. Utilizing the captured data by the respective air vehicles 102 and 104, the status of the air vehicles and the terrain features may dynamically be updated. The statuses can then be utilized for various functions both initiated and occurring in the air vehicles 102 and 104 or the ground station 106. The communication between the air vehicles 102 and 104 and the ground station 106 allow these multiple entities to work in collaboration to more finely refine the positional data associated with each respective entity.

Figure 2:
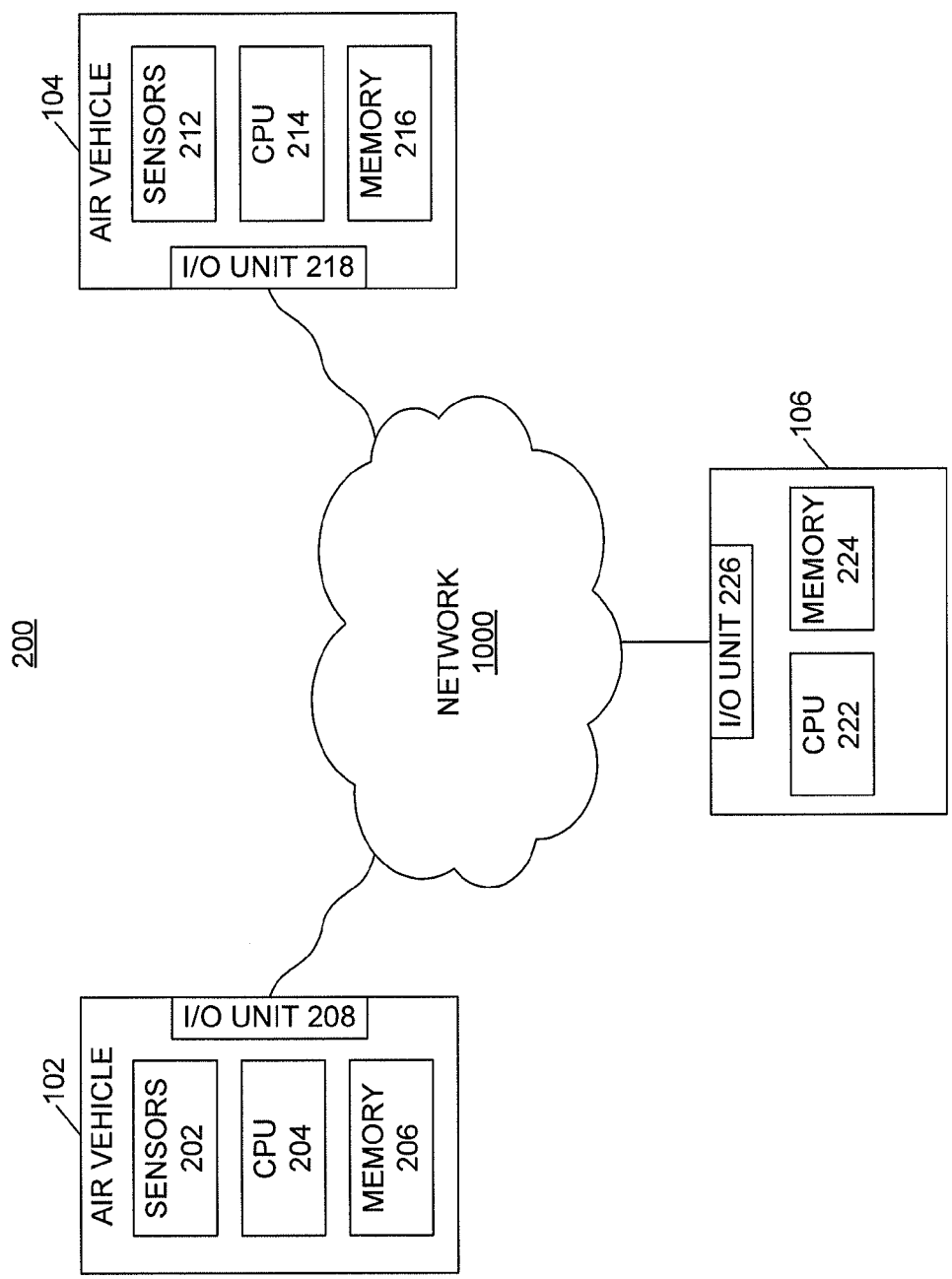
FIG. 2 is an exemplary embodiment of a system for creating a digital representation of a status of air vehicles and of sensed external objects.

FIG. 2 is an illustration of an exemplary embodiment of a system 200 for creating a digital representation of a status of air vehicles and of sensed external objects. Air vehicle 102 may include sensors 202, a central processing unit (CPU) 204, memory 206, and an input/output unit (I/O unit) 208 for sending data over the network 1000 or any other medium. Similarly, air vehicle 104 may include sensors 212, CPU 214, memory 216, and I/O unit 218 for sending data over the network 1000 or any other medium. Ground station 106 may include CPU 222, memory 224, and I/O unit 226 for sending data over the network 1000 or any other medium. Sensors 202 and 212 may be coupled externally to the air vehicles 102 and 104, respectively. The air vehicles 102 and 104 may also have access to a global positioning system (GPS).

System 200 is exemplary only, and the number and distribution of the various entities shown may be different depending on specific embodiments. For example, in some embodiments, air vehicle 102 may further include another database (not illustrated) apart from the memory 206, or the database may be part of the memory 206. Additionally, the functions of system 200 may be distributed over multiple entities, including other distribution systems, air vehicles, computers, servers, or other computing platforms. Thus, the configuration described in system 200 is an example only and is not intended to be limiting.

In some embodiments, there may be plurality of air vehicles or just one air vehicle located in the vicinity during travel. In some of these embodiments, the various air vehicle sensors may be similar to the sensors air vehicles 102 and 104, and may operate together or collectively to capture data. This captured data may then be shared with other air vehicles and/or ground stations. For example, there may be one or more air vehicles which capture data of sensed external objects or that may obtain instructions or data from the system 200 and may disseminate this information to other air vehicles or ground stations connected to the network.

Figure 3:
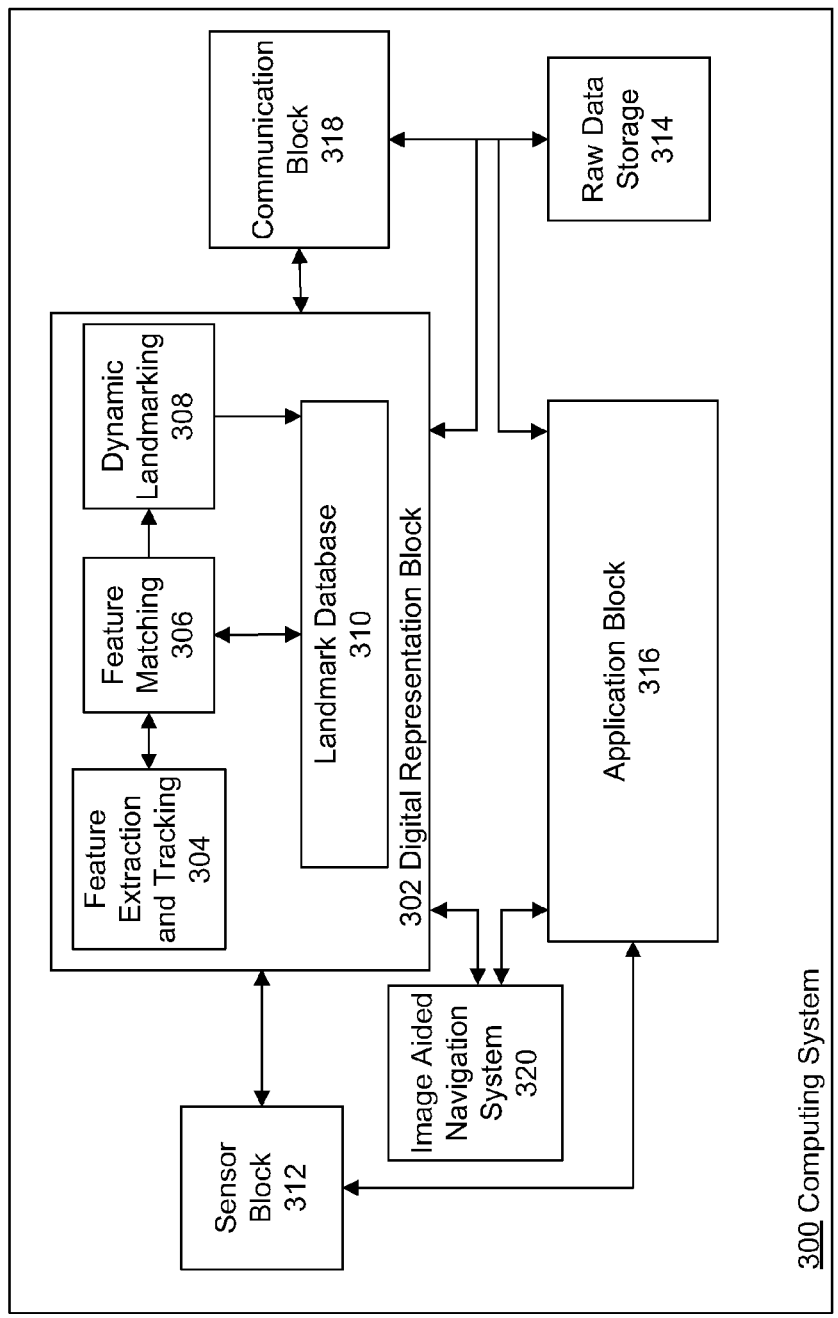
FIG. 3 is a block diagram illustrating an exemplary embodiment of a computing system utilized by exemplary embodiments.

Referring now to FIG. 3, a block diagram of an exemplary embodiment of a computing system 300 utilized by the disclosed embodiments is illustrated. The computing system 300 may be a function of the respective CPUs 204, 214, and 222, the memories 206, 216, and 224, either individually or in a combination. The exemplary system 300 includes a digital representation block 302. The digital representation block 302 includes a feature extraction and tracking block 304, a feature matching block 306, a dynamic landmarking block 308, and a landmark database 310.

The exemplary computing system 300 also includes a sensor block 312, and based on any data captured by sensors 202 and 212 coupled to the sensor block 312, the feature extraction and tracking block 304 extracts external objects including terrain features, for example, terrain features 108 and 110, and tracks them. The sensors 202 and 212 may include imagers and may detect signal strength, etc., as explained in more detail with respect to FIG. 4.

The feature matching block 306 may determine whether or not the extracted terrain feature previously exists in the landmark database 310. According to some embodiments, once terrain features are tracked, the dynamic landmarking block 308 estimates the baseline vector between the associated air vehicle and the corresponding terrain features by fusing all information available, including newly captured data provided through the sensor block 312 and the landmark database 310. The landmark database 310 may include positional data associated with travel of each of the one or more air vehicles and the sensed external objects based on associated navigation information and the dynamic landmarking, covariance of the positional data, and/or sensor signal snippets of the sensed external objects. Details of information included and updated in the landmark database 310 or similar landmark database are further explained with respect to FIG. 4. The landmark database 310 may be a database stored in one or more of memories 206, 216, and 224, a combination thereof, or any external memory that may utilize this information for more accurate targeting and/or navigation of the air vehicles.

According to some embodiments, the data from the sensors may include the pixel location of a feature in an image plane that is captured by a sensor. Additional information related to the terrain features captured by sensors on an air vehicle may also include raw sensor data (e.g., raw imagery), signal strength, distance, and sensor source.

Additionally, data captured by sensors may be stored within a raw data storage block 314. The raw data storage block 314 may be embodied within the respective memories 206 or 216 of the respective air vehicles 102 and 104. According to some embodiments, instead of all the data captured by the respective sensors being exchanged over the network 1000, only essential data with respect to the landmark database 310 may be exchanged, but if desired, the data in the raw data storage block 314 may be utilized by the system 300 and/or shared over the network 1000.

According to some embodiments, an application block 316 may be configured to perform various functions in an air vehicle. For example, application block 316 may perform or control one or more of the following: targeting and classification of sensed objects, change in directions of an air vehicle, sense and avoid objects in the path of an air vehicle, and image-based camera stabilization. Application block 316 may be configured to perform various other functions, some of which are outlined below with respect to FIG. 4.

The computing system 300 may also include an image-aided navigation system 320. The image-aided navigation system 320 may be configured to navigate (or aid navigation of) an air vehicle in the absence of a GPS. In some embodiments, the image-aided navigation system 320 may be a part of the application block 316.

The computing system 300 may also include a communication block 318, which is configured to allow for communication between the system and external sources. According to some embodiments, the communication block 318 also allows for communication between the air vehicles 102 and 104 and the ground station 106, so that the information may be seamlessly exchanged between these entities, allowing for a more accurate representation of the status of the air vehicles and the external features.

According to some embodiments, the computing system 300 may be implemented in an air vehicle, in a ground station, in a server, or in a collaborative environment. Such embodiments may be implemented in separate entities with the ability to communicate and refine the landmark databases in each respective entity to update the statuses of the air vehicles and the terrain features.

Figure 4:
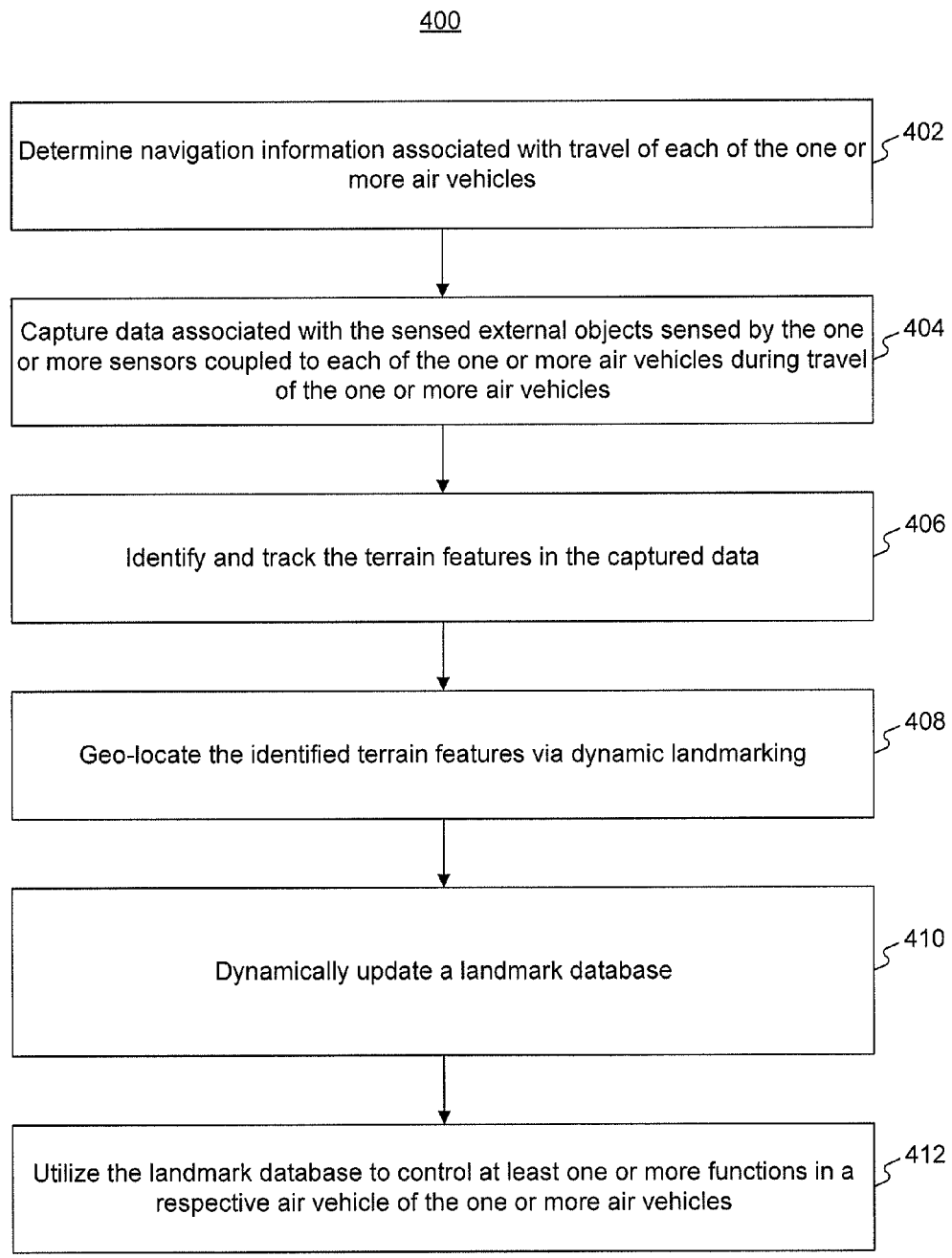
FIG. 4 is a flow chart of an exemplary embodiment of a method for creating a digital representation of a status of air vehicles and of sensed external objects.

FIG. 4 illustrates the operations of an exemplary embodiment of a method 400 for creating a digital representation of a status of one or more air vehicles and of sensed external objects. The method 400 may be executed by CPU 204, CPU 214, CPU 222, or any combination of the three. Accordingly, the method 400 may take place on air vehicle 102, air vehicle 104, and/or ground station 106. Moreover, some steps in the method 400 may be performed in air vehicles 102 and 104, while others may be performed by the ground station 106. The method 400 may also be performed in conjunction with other components not shown in the system 200. All steps in the method 400 are optional and can be rearranged. Additional steps can also be added to the method 400.

According to the exemplary embodiment shown, at step 402, the method 400 may determine navigation information associated with travel of each of the one or more air vehicles. That is, for any air vehicles that may be travelling on a path, current navigation information and/or a current location is determined. For example, navigation information and the current location of the air vehicles 102 and 104 may be determined.

At step 404, the method 400 captures data associated with the sensed external objects sensed by the one or more sensors coupled to each of the one or more air vehicles during travel of the one or more air vehicles. The sensed external objects may include terrain features. For example, sensors 202 and 212 associated with the air vehicles 102 and 104 sense the external objects, which include terrain features 110 and 108, and data associated with the terrain features 110 and 108 is captured. This data may include imagery, signal strength, and other characteristics associated with the terrain features.

At step 406, the method 400 identifies and tracks the terrain features in the captured data. For example, from images of the terrain captured by air vehicle 102, terrain feature 110 is identified and tracked.

At step 408, the method 400 geo-locates the identified terrain features via dynamic landmarking. For example, utilizing dynamic landmarking, the terrain feature 110 which has been identified is geo-located to create accurate positional data, which may be stored.

At step 410, the method 400 dynamically updates data in a landmark database. The landmark data may include at least one or more of positional data associated with travel of each of the one or more air vehicles and the sensed external objects based on the determined navigation information and the dynamic landmarking, covariance of the positional data, and sensor signal snippets of the sensed external object (e.g., of terrain features and/or sensed signals such as, for example, radio signals).

In some embodiments, the positional data may be updated by updating at least one of position information associated with the identified terrain feature, sensor sources associated with the identified terrain feature, and information related to other attributes associated with the identified terrain feature. In some embodiments, the positional data in a landmark database may be updated based on data from a server remote from the one or more air vehicles.

At step 412, the method 400 may use the landmark database to control at least one or more functions in a respective air vehicle of the one or more air vehicles. For example, the functions may include navigating the respective air vehicle based on the positional data in the absence of availability to the respective air vehicle of GPS. For example, when GPS is not available, if geo-located landmarks from the landmark database are in view of sensors of the air vehicle, these landmarks may be utilized to navigate (or aid navigation of) the air vehicle. Thus, the geo-located landmarks may be used as pseudolites and may provide information to triangulate the position of the air vehicle. For example, each image or sensing of a landmark may generate a vector pointing to the air vehicle, and the vectors may then be directly used as measurement updates to update the positional database, thereby updating the status of the air vehicle.

In some embodiments, if GPS availability is lost and there are not any geo-located landmarks that are in view or can be sensed by the sensors, new landmarks may be geo-located relative to the air vehicle. As a result, a status of the air vehicles and the sensed terrain features may permit dynamic updating of navigation information, and the landmark database may be used to navigate the air vehicle. This may prevent or reduce the growth of position drift of an air vehicle until a GPS connection may be reestablished by using external objects, including newly determined terrain features. According to some embodiments, measurement updates from these "relative" pseudolites may slow the growth of position drift compared to typical dead-reckoning navigation techniques that rely on wind and airspeed information.

In some embodiments, as an air vehicle gathers sensor data and tracks terrain features from frame to frame or captured video images, these measurements may be utilized to estimate air vehicle parameters such as, for example, camera calibration parameters, gimbal angle errors, and mounting misalignments. By estimating these parameters in real-time, the resulting errors may be more efficiently reduced. This may directly reduce target location error, and may improve the accuracy of pointing and metadata tags.

In some embodiments, air vehicle navigation may be further improved by generating stabilizing gimbal commands based on imagery feedback. For example, as features in the image move due to turbulence, vehicle movement, and other disturbances, the rate of the air vehicle's movement may be determined using image processing techniques. This rate may be used as a feedback signal in a payload control system to improve the ability of the system to reject disturbances and to increase the damping ratio of the pointing control system. Increasing the damping ratio may allow the payload to stay firmly locked onto a stationary or slowly moving target and to smoothly swing from one point-at coordinate to another with very little overshoot.

In some embodiments, the system may build a three-dimensional representation of an air vehicle's surroundings, including static and moving objects (other air vehicles and/or landmark features), which may be updated in real-time in the landmark database. The data captured by an air vehicle may be further augmented by data from other air vehicles or from information from a ground station. The ground station may, for example, have access to the position of other ISR assets, which may be uploaded to an air vehicle's landmark database.

In some embodiments, other systems (or features of the present systems, which have not been disclosed in detail) may use the landmark databases to check the trajectory of any air vehicles against potential conflicts, such as with terrain features or other air vehicles and, if desirable, adjust the air vehicle's trajectory in real-time to avoid a collision. For example, the system may utilize time-dependent visibility graphs to efficiently resolve separation assurance conflicts and simple heuristics for resolving collision avoidance conflicts. According to some embodiments, the collision avoidance functionality may be hosted on airborne platforms in the air vehicles, and the separation assurance function may be hosted by the ground station.

In some embodiments, instead of downlinking an entire data stream of data captured by an air vehicle, all or some of the raw data that is captured by sensors on an air vehicle may be stored onboard the air vehicle. In some embodiments, low-bandwidth notifications about the stored data being collected may be sent to an external server or other air vehicles. Accordingly, a user with access to the server may request specific segments of the data stored onboard the air vehicle to be down-linked. This may provide for the availability of all the data captured by the air vehicle for specific purposes as desired, while preserving the datalink bandwidth required for communication between an air vehicle and an external server or another air vehicle, since only the desired or requested data is transmitted by the air vehicle.

Accordingly, utilization of at least some of the exemplary embodiments of the method 400 for creating a digital representation of statuses of air vehicles and terrain features may permit the coordination of multiple ISR assets. For example, a coordinated road search and/or a coordinated improvised explosive device detection mission executed by two small unmanned air vehicles equipped with complementary sensors may be utilized. Such an exemplary mission may be initiated by a user who designates a path on a digital map, generating a precise continuous ground-track for the airborne sensors to follow. This path may then be transmitted over a network (e.g., network 1000) to the air vehicles, which may autonomously determine optimal flight paths to keep the footprint on the ground-track and start the road search utilizing the landmark database. The improvised explosive device detection may thus be initiated remotely on the ground, based on the real-time imagery data delivered over the network.

While certain features and embodiments of the invention have been described, other embodiments of the invention will be apparent to those skilled in the art from consideration of the specification and practice of the embodiments of the invention disclosed herein. Furthermore, although aspects of embodiments of the present invention have been described in part as software, computer-executable instructions, and/or other data stored in memory and other storage mediums, one skilled in the art will appreciate that these aspects can also be stored on or read from other types of tangible, non-transitory computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the invention.

It is intended that the specification and examples be considered as exemplary only, with a true scope and spirit of the invention being indicated by the following claims.

What is claimed is:

1. A system for creating a digital representation of a status of one or more air vehicles and of sensed external objects, the system comprising:
   one or more sensors configured to be coupled to each of the one or more air vehicles; and
   a processor associated with the one or more sensors and configured to:
      determine navigation information associated with travel of at least one of the one or more air vehicles;
      capture data associated with the sensed external objects sensed by the one or more sensors during travel of the one or more air vehicles, the sensed external objects comprising terrain features and sensed signals;
      identify and track the sensed external objects in the captured data;
      geo-locate the identified sensed external objects via dynamic landmarking;
      dynamically update a landmark database, the landmark database comprising at least two or more of positional data associated with travel of each of the one or more air vehicles and the sensed external objects based on the determined navigation information and the dynamic landmarking, covariance of the positional data, and sensor signal snippets of the sensed external objects; and
      utilize the landmark database to control at least one or more functions in a respective air vehicle of the one or more air vehicles,
      wherein one of the functions in the at least one or more functions comprises navigating the respective air vehicle based on the positional data in the absence of availability to the respective air vehicle of a global positioning system and generating stabilizing gimbal commands for a payload control system based on imagery feedback, and
      wherein the imagery feedback comprises an air vehicle's movement obtained via tracking of images of terrain features and image processing.

2. The system according to claim 1, wherein the processor is further configured to:
   dynamically update the landmark database with respect to identified sensed external objects based on geo-locating the identified sensed external objects in three dimensions when a global positioning system is available to the one or more air vehicles, and
   dynamically update the landmark database data with respect to the one or more air vehicles by utilizing stored positional data with respect to the identified sensed external objects to determine the position of the one or more air vehicles when the global positioning system is not available to the one or more air vehicles.

3. The system according to claim 1, wherein the captured data associated with the sensed external objects comprises at least one of raw sensor data, signal strength, distance, and sensor source.

4. The system according to claim 1, wherein the status of the one or more air vehicles comprises altitudes and positions of the one or more air vehicles both absolute and relative to the sensed external objects and the other ones of the one or more air vehicles, and wherein the status of the sensed external objects comprises relative positions, dynamics, and attributes of the sensed external objects.

5. The system according to claim 1, wherein the processor is configured to update the positional data by updating at least one of position information associated with the identified sensed external objects, sensor sources associated with the identified sensed external objects, and information related to other attributes associated with the identified sensed external objects.

6. The system according to claim 1, wherein the processor is further configured to update the landmark database based on data from a server remote from the one or more air vehicles.

7. The system according to claim 1, wherein one of the functions in the at least one or more functions comprises at least one of calibrating a camera associated with the respective air vehicle, stabilizing a camera associated with the respective air vehicle, and providing to a recipient located remote from the air vehicle data captured by at least one of a camera and another sensor associated with the respective air vehicle.

8. A processor implemented method for creating a digital representation of a status of one or more air vehicles and of sensed external objects, the method comprising:
determining navigation information associated with travel of at least one of the one or more air vehicles;
capturing data associated with the sensed external objects sensed by the one or more sensors during travel of the one or more air vehicles, the sensed external objects comprising terrain features and sensed signals;
identifying and tracking the sensed external objects in the captured data;
geo-locating the identified sensed external objects via dynamic landmarking;
dynamically updating a landmark database, the landmark database comprising at least two or more of positional data associated with travel of each of the one or more air vehicles and the sensed external objects based on the determined navigation information and the dynamic landmarking, covariance of the positional data, and sensor signal snippets of the sensed external objects; and
utilizing the landmark database to control at least one or more functions in a respective air vehicle of the one or more air vehicles,
wherein one of the functions in the at least one or more functions comprises navigating the respective air vehicle based on the positional data in the absence of availability to the respective air vehicle of a global positioning system and generating stabilizing gimbal commands for a payload control system based on imagery feedback, and
wherein the imagery feedback comprises an air vehicle's movement obtained via tracking of terrain features and image processing.

9. The processor implemented method according to claim 8, wherein the method further comprises:
dynamically updating the landmark database with respect to identified sensed external objects based on geo-locating the identified sensed external objects in three dimensions when a global positioning system is available to the one or more air vehicles, and
dynamically updating the landmark database data with respect to the one or more air vehicles by utilizing stored positional data with respect to the identified sensed external objects to determine the position of the one or more air vehicles when the global positioning system is not available to the one or more air vehicles.

10. The processor implemented method according to claim 8, wherein the captured data associated with the sensed external objects comprises at least one of raw sensor data, signal strength, distance, and sensor source.

11. The processor implemented method according to claim 8, wherein the status of the one or more air vehicles comprises altitudes and positions of the one or more air vehicles both absolute and relative to the sensed external objects and the other ones of the one or more air vehicles, and wherein the status of the sensed external objects comprises relative positions, dynamics, and attributes of the sensed external objects.

12. The processor implemented method according to claim 8, wherein updating the positional data by updating at least one of position information associated with the identified sensed external objects, sensor sources associated with the identified sensed external objects, and information related to other attributes associated with the identified sensed external objects.

13. The processor implemented method according to claim 8, wherein the method further comprises updating the landmark database based on data from a server remote from the one or more air vehicles.

14. The processor implemented method according to claim 8, wherein one of the functions in the at least one or more functions comprises at least one of calibrating a camera associated with the respective air vehicle, stabilizing a camera associated with the respective air vehicle, and providing to a recipient located remote from the air vehicle data captured by at least one of a camera and another sensor associated with the respective air vehicle.

15. A computer readable storage medium storing one or more programs, the one or more programs comprising instructions that, when executed by a computing device, cause the device to:
determine navigation information associated with travel of one or more air vehicles;
capture data associated with sensed external objects sensed during travel of the one or more air vehicles, the sensed external objects comprising terrain features and sensed signals;
identify and track the sensed external objects in the captured data;
geo-locate the identified sensed external objects via dynamic landmarking;
dynamically update a landmark database, the landmark database comprising at least two or more of positional data associated with travel of each of the one or more air vehicles and the sensed external objects based on the determined navigation information and the dynamic landmarking, covariance of the positional data, and sensor signal snippets of the sensed external objects; and
utilize the landmark database to control at least one or more functions in a respective air vehicle of the one or more air vehicles,
wherein one of the functions in the at least one or more functions comprises navigating the respective air vehicle based on the positional data in the absence of availability to the respective air vehicle of a global positioning system and generating stabilizing gimbal commands for a payload control system based on imagery feedback, and
wherein the imagery feedback comprises an air vehicle's movement obtained via tracking of terrain features and image processing.

\* \* \* \* \*